United States Patent
Banner et al.

(10) Patent No.: US 8,384,890 B2
(45) Date of Patent: Feb. 26, 2013

(54) APPARATUS FOR MEASURING THE INNER SURFACE OF A CULVERT OR OTHER TUNNEL DEFINING STRUCTURE IMBEDDED IN THE GROUND

(75) Inventors: Alvin C. Banner, Centerville, OH (US); Eugene D. Highlander, Wayneville, OH (US); David J. Hunt, Englewood, OH (US); Jay B. Evans, Huber Heights, OH (US)

(73) Assignee: CBC Engineers & Associates Ltd., Centerville, OH (US)

( * ) Notice: Subject to any disclaimer, the term of this patent is extended or adjusted under 35 U.S.C. 154(b) by 565 days.

(21) Appl. No.: 12/653,446

(22) Filed: Dec. 14, 2009

(65) Prior Publication Data

US 2011/0141464 A1    Jun. 16, 2011

(51) Int. Cl.
*G01N 21/00* (2006.01)
*G01B 11/24* (2006.01)

(52) U.S. Cl. ..................... 356/241.1; 356/601
(58) Field of Classification Search .................. None
See application file for complete search history.

(56) References Cited

U.S. PATENT DOCUMENTS

| | | | | |
|---|---|---|---|---|
| 1,672,596 | A * | 6/1928 | Zerk | 248/188.5 |
| 4,179,216 | A * | 12/1979 | Theurer et al. | 356/4.01 |
| 4,988,192 | A * | 1/1991 | Knittel | 356/138 |
| 6,249,007 | B1 * | 6/2001 | Gooch et al. | 250/559.31 |
| 6,332,276 | B1 * | 12/2001 | Mangel | 33/286 |
| 7,164,476 | B2 | 1/2007 | Shima et al. | |
| 7,345,757 | B2 | 3/2008 | Penza | |
| 7,349,083 | B2 | 3/2008 | Draggie et al. | |
| 7,557,914 | B2 | 7/2009 | Thompson et al. | |
| 7,567,350 | B2 | 7/2009 | Cao et al. | |
| 7,841,094 | B2 * | 11/2010 | Schumacher | 33/282 |

FOREIGN PATENT DOCUMENTS

| | | | |
|---|---|---|---|
| DE | 3313932 A1 * | 10/1984 | |
| GB | 2070880 A * | 9/1981 | |
| JP | 2000266541 A * | 9/2000 | |
| JP | 2001091249 A * | 4/2001 | |
| JP | 2001255144 A * | 9/2001 | |
| JP | 2002168617 A * | 6/2002 | |
| KR | 2002058577 A * | 7/2002 | |

* cited by examiner

*Primary Examiner* — Gordon Stock, Jr.
(74) *Attorney, Agent, or Firm* — Jacox, Meckstroth & Jenkins

(57) ABSTRACT

The inner surface of an underground tunnel defining structure, such as a culvert or pipe, is measured by apparatus including a portable hand held battery powered laser unit releasably attached to a rotor disk supported within the tunnel by an adjustable stand or tripod for rotation on a generally horizontal axis. The disk has peripherally spaced notches which receive a spring-biased latch member for positioning the disk and laser unit at predetermined angular positions about the axis. The laser unit emits a laser beam to a target on the inner surface of the structure and displays on the unit a precision distance reading from the laser unit to the target. The distance reading for each target is entered in a chart for comparison with a prior measurement reading to indicate changes in the shape or profile of the inner surface.

8 Claims, 2 Drawing Sheets

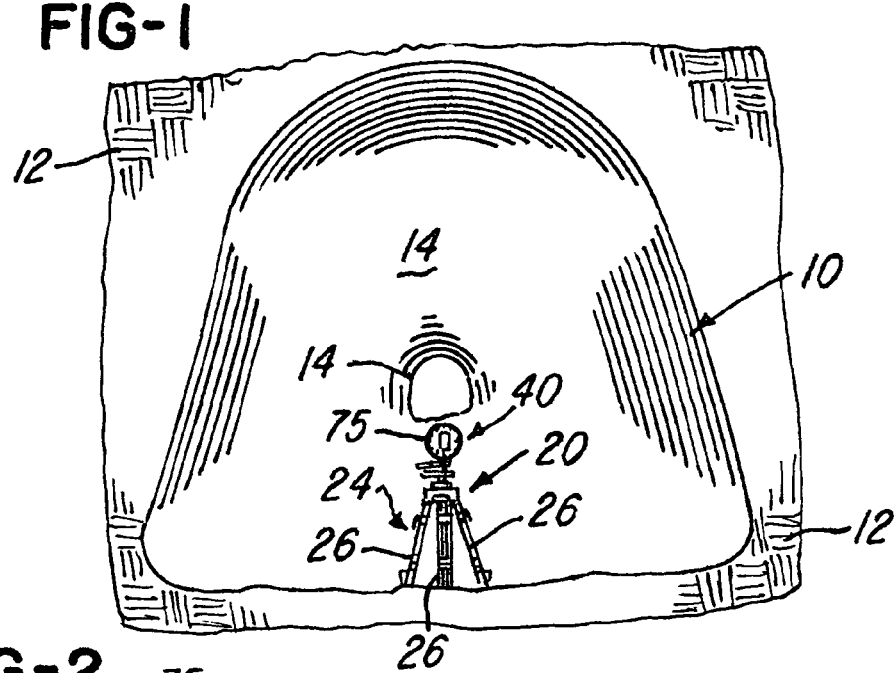
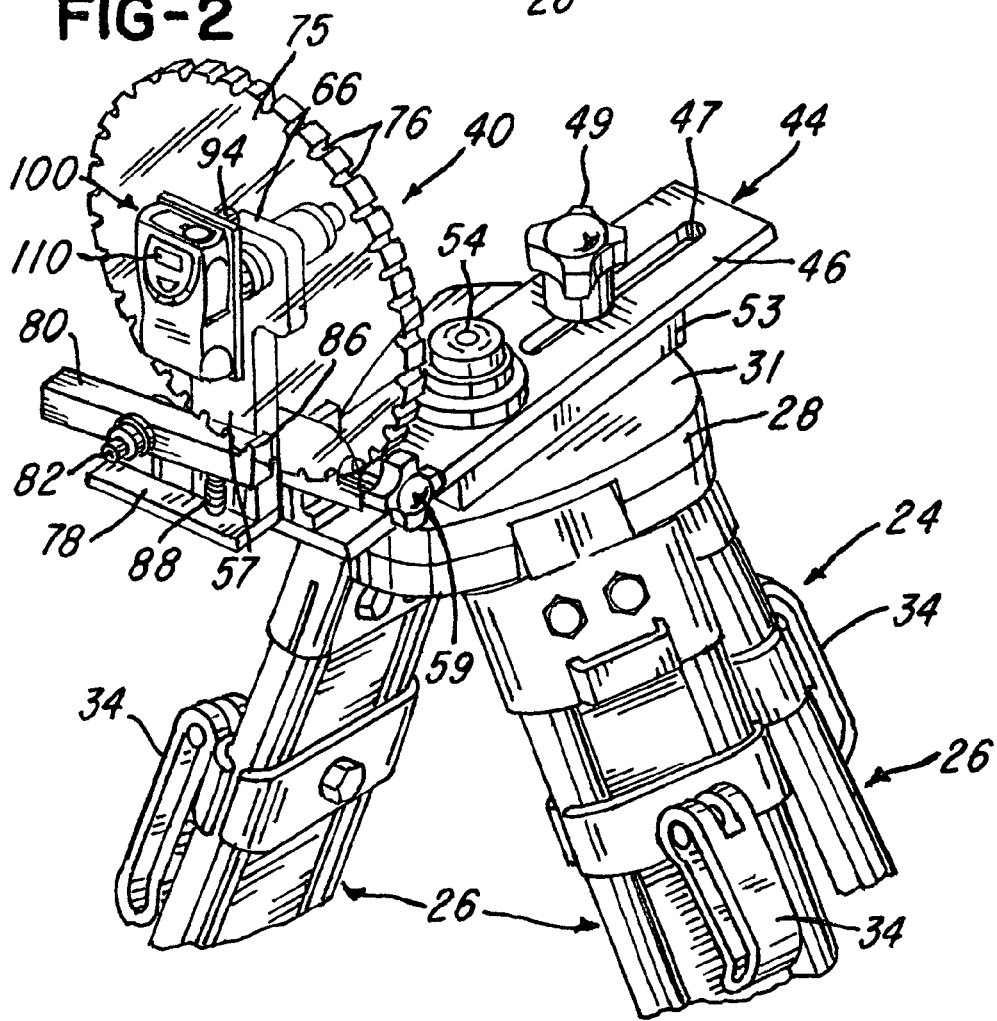

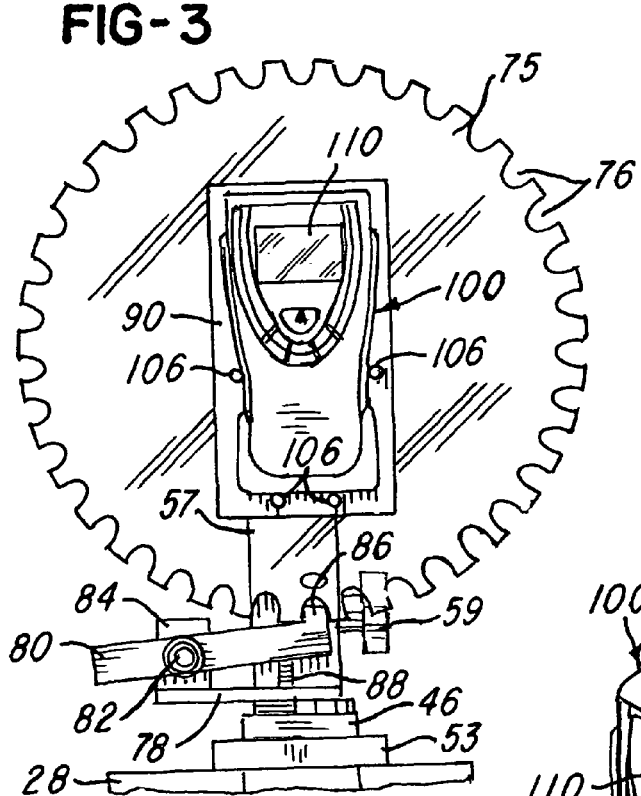
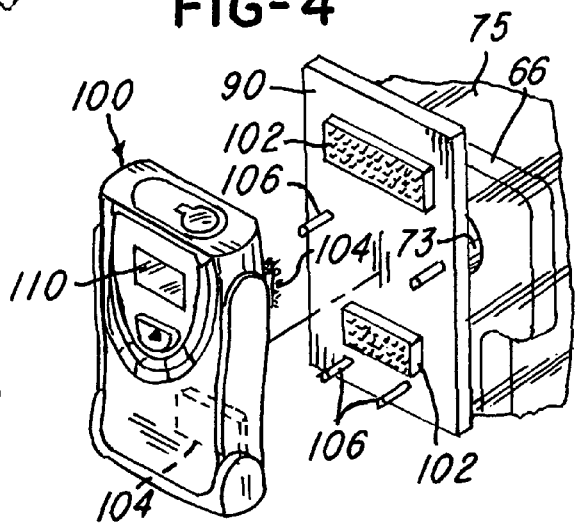
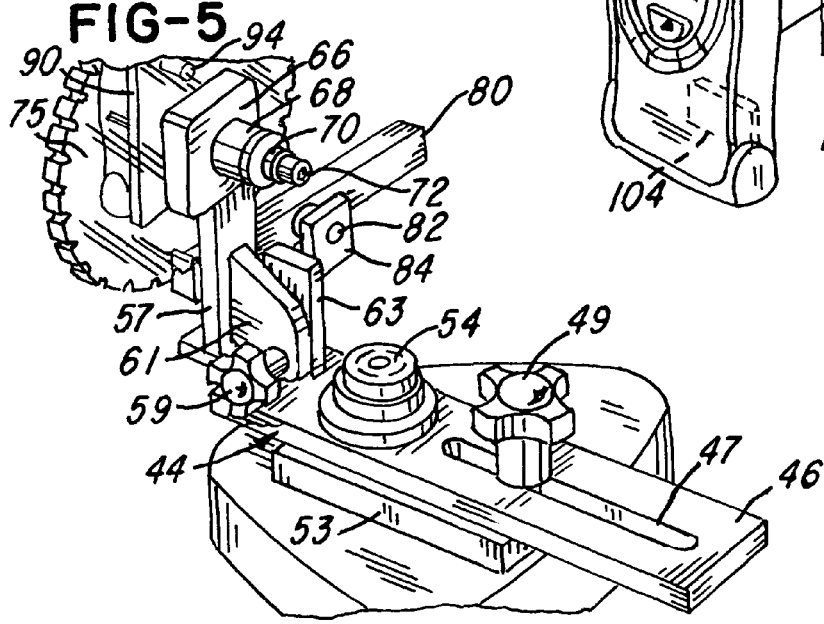

APPARATUS FOR MEASURING THE INNER SURFACE OF A CULVERT OR OTHER TUNNEL DEFINING STRUCTURE IMBEDDED IN THE GROUND

BACKGROUND OF THE INVENTION

Throughout the United States, there are many underpass structures that define a tunnel extending under a roadway, such as, for example, a culvert or pipe arch formed of corrugated sheet metal or other material which can change in shape or cross-sectional configuration over a period of time. Frequently, it is desirable to determine the degree of change in configuration or shape by comparing a current actual cross-sectional shape with the original or a prior cross-sectional shape to insure that the structure continues to have sufficient strength to support the load above the structure. While horizontal and vertical measurements are sometimes manually made of the structure at intervals along the length of the tunnel, such measurements require substantial time and effort, resulting in significant cost. There are also various forms or types of complex laser equipment for measuring and/or detecting the inner surfaces of a bore or pipe, such as disclosed, for example, in U.S. Pat. Nos. 7,164,476, 7,345, 757, 7,349,083, 7,557,914 and 7,567,350. However, none of the equipment is suitable for quickly, economically and efficiently measuring and determining the cross-sectional shape or configuration of a tunnel defining structure.

SUMMARY OF THE INVENTION

The present invention is directed to apparatus for measuring the inner surface of a structure embedded in the ground and defining a tunnel, such as a corrugated metal culvert or arch. The apparatus is economical in construction and provides for quickly and efficiently measuring and determining the shape or cross-sectional configuration of the structure. The apparatus is also portable and may be easily and quickly shifted to different positions along the length of the tunnel. In general, the apparatus includes a portable stand which is supported by a bottom portion of the structure or the tunnel and projects upwardly into the tunnel. The top of the stand supports a rotor for rotation on a generally horizontal axis, and a portable hand held type battery powered laser unit is supported by the rotor for rotation with the rotor on its axis. The laser unit emits a beam of coherent light to a target on the inner surface of the structure and automatically and precisely measures and displays the distance from the laser unit to the target. The rotor and laser unit rotate together on the axis to predetermined angular positions around the axis to provide for obtaining a distance measurement to a target on the inner surface at each of the angular positions. A chart may be used to record the displayed measured distance to each target, and the recorded data may be used to generate a two dimensional shape of the inner surface for comparison with the original shape or a previously measured shape.

Other features and advantages of the invention will be apparent from the following description, the accompanying drawings and the appended claims.

BRIEF DESCRIPTION OF THE DRAWINGS

FIG. 1 is a vertical section through a corrugated metal culvert defining a tunnel and in which is positioned portable measuring apparatus constructed in accordance with the invention;

FIG. 2 is an enlarged fragmentary perspective view of the measuring apparatus shown in FIG. 1;

FIG. 3 is an elevational front view of the measuring apparatus shown in FIG. 2;

FIG. 4 is an exploded perspective view of the laser measuring unit shown in FIG. 3 and its supporting panel; and FIG. 5 is a fragmentary perspective rear view of the apparatus shown in FIG. 2.

DESCRIPTION OF THE PREFERRED EMBODIMENT

Referring to FIG. 1, a tunnel defining structure in the form of corrugated sheet metal tubular culvert 10 extends within the earth or ground 12 and defines a tunnel 14 which commonly serves as a water underpass below a roadway. As an example, the culvert 10 may have a span of 17 feet and a rise of 16 feet. As a result of the loading on the culvert 10 by the earth or ground 12 pressing against the sides and top portion of the culvert and/or a roadway above the culvert, it is not uncommon for the culvert to be distorted after a period of time with the distortion creating stresses in the culvert and changing the cross-sectional shape or profile or configuration of the culvert. Thus it is sometimes desirable to measure the cross-sectional shape or configuration of the inner surface of the culvert 10 at longitudinal spaced intervals along the length of the tunnel 14 so that the current actual shape may be compared with the original shape or a previous measured shape of the culvert and to determine if there are any bulges or flat areas or tears in the culvert.

In accordance with the present invention, measuring apparatus 20 includes a support stand in the form of a collapsible tripod 24 of the type commonly used by surveyors and which has three elongated and adjustable telescopic legs 26 each pivotally connected to a top support plate or platform 28 having a flat top surface 31. Each of the foldable and adjustable telescopic legs 26 has a clamping mechanism 34 which provides for infinite longitudinal adjustment of each leg. The apparatus 20 also includes a measuring system 40 mounted on the top surface 31 of the adjustable stand or tripod 24. The measuring system includes an adjustable angle bracket 44 (FIG. 5) having an elongated horizontal member or leg 46 with a longitudinal extending slot 47 for receiving a threaded stud (not shown) connected to a knob 49. The stud is threaded into a nut (not shown) adjacent the bottom surface of the top plate 28 so that when the knob 49 is tightened with the member or leg 46 in a selected horizontal position, the leg 46 is clamped against a spacer plate 53 and the top surface 31 of the support platform 28. A circular bubble-type level 54 is mounted on the leg 46 and provides for conveniently leveling the top surface 31 of the support platform of the tripod 24 by simply adjusting one or more of the legs 26.

The adjustable angle bracket 44 also includes an upwardly projecting or generally vertical member or leg 57 which is pivotally connected to the leg 46 and may be angularly positioned relative to the leg 46 after releasing a knob 59 having a threaded stud (not shown) extending through a slot within an ear or flange 61 secured or welded to the leg 57. The threaded stud extends into a threaded hole within a vertical flange 63 secured or welded to the leg 46 so that when the knob 59 is tightened, the leg 57 is held in a selected angular position relative to the leg 46.

The vertical leg 57 has an upper end portion 66 which supports a bearing 68 in which a shaft 70 is supported for rotation on a substantially horizontal axis. The rearward end portion of the shaft 70 is secured by a screw 72, and a forward end portion of the shaft 70 is secured to a hub 73 which supports a circular rotor or disk 75 for rotation with the shaft on a horizontal axis. The disk 75 has peripherally spaced semi-circular recesses or notches 76 which are spaced every ten degrees to provide thirty-six notches around the perimeter of the disk 75. A horizontal plate or arm 78 projects laterally from the front end of the leg 46 and supports a stop or latch lever 80 (FIG. 3) for pivotal movement on a stud 82 threaded into a flange 84 projecting upwardly from the arm 78. The lever 80 has a square stud 86 on its inner end, and the stud 86 projects into one of the notches 76 to prevent or lock the disk 75 from rotating at a selected position of the disk. The lever 80 is spring biased by a compression spring 88 which is compressed when the outer end of the lever 80 is pressed upwardly to retract the stud 86 from a notch 76 so that the disk 75 is free to rotate.

As shown in FIGS. 3 & 4, a vertical rectangular panel 90 is spaced from and connected to the disk 75 for rotation with the disk by a set of posts 94 (FIGS. 2 & 5) which project into and are adhesively attached to the disk 75 and panel 90. As shown in FIGS. 2-4, a portable battery powered laser unit 100 is removably attached to the panel 90 by strips 102 and 104 of hook and loop fasteners, commonly referred to by the trademark VELCRO. A set of four locating pins 106 project forwardly from the panel 90 (FIGS. 3 & 4) and precisely position the laser unit 100 on the disk 75 so that the center of the unit 100 is on the axis of rotation. One form of hand held type laser unit which has provided satisfactory results is produced by The Stanley Works and sold as a laser measuring tool under the trademarks FatMax and IntelliMeasure. The tool or unit allows one person to measure the distance from the unit to a target located up to 40 feet and has an accuracy of plus or minus 0.5 percent. The unit emits a coherent laser beam and has an LCD display screen showing the distance from the center or bottom end of the laser unit to the target.

In operation of the measuring apparatus 20 within the corrugated metal culvert 10, the unit 20 is positioned generally within a center portion of the tunnel 14 defined by the culvert with the support stand or tripod 24 supported by the floor of the culvert. If the tunnel defining structure does not have a floor, the apparatus 20 is placed on the ground or whatever forms the bottom surface for the tunnel. After the apparatus is positioned and the laser unit 100 is energized, the unit emits a laser beam on a target or spot on the inner surface of the culvert. The unit 100 then displays on a screen 110 the measured distance between the center of the unit 100 and the spot or target on the inner surface of the culvert. The distance is recorded on a chart, after which the latch member or lever 80 is released, and the disk 75 is manually rotated ten degrees or to another selected angle where the disk 75 is retained by the latch lever 80. Then another distance reading is made and displayed by the unit 100 and recorded on the chart.

If it is desired to have an actual cross-sectional profile or shape of the entire inner surface of the culvert at a selected location, a measurement may be taken every ten degrees by indexing the disk 75 and laser unit 100 in angular increments of ten degrees through 360 degrees by using the stop lever 80 successively within each of the notches 76. If the actual profile or shape of only an upper portion of the culvert or of any other portion of the culvert is desired, the disk 75 may be indexed through only the desired angle of measurements.

From the drawings and the above description, it is apparent that measuring apparatus constructed in accordance with the invention provides desirable features and advantages. For example, the portable apparatus 20 is simple to use at any longitudinally spaced intervals along the length of the tunnel 14 defined by the underground structure. The legs 26 may be quickly adjusted to position the measuring system 40 at the desired elevation and location within the tunnel. The rotation of the disk 75 on its axis assures that the laser measuring beam emitted by the laser unit 100 is always in a vertical or substantially vertical plane within the tunnel. In addition, after the support stand or tripod 24 is positioned within the tunnel and the top surface 31 is leveled using the bubble level 54, a more precise position of the laser beam emitted from the unit 100 may be obtained by using the adjustment knobs 49 and 59, for example, to assure that the plane of measurement by the unit 100 is always in only one corrugation of the culvert 10. The portable hand held laser unit 100 may also be easily removed from the panel 90 and disk 75 for storage or when it is desired to service the laser unit 100, for example, to replace the battery or change the mode of display between English and Metric measurements.

While the form of measuring apparatus herein described constitutes a preferred embodiment of the invention, it is to be understood that the invention is not limited to this precise form of the invention, and that changes made therein without departing from the scope and spirit of the invention as defined in the appended claims.

What is claimed is:

1. Apparatus for measuring the inner surface of a structure embedded in the ground and defining a tunnel, said apparatus comprising
    a portable stand adapted to be supported by a bottom portion of said structure and projecting upwardly into said tunnel,
    a rotor supported by said stand for rotation on a generally horizontal axis and having a support surface,
    a portable battery powered laser unit mounted on said support surface of said rotor and having means for emitting a laser beam and for determining and displaying a distance from said laser unit to a target on said inner surface of said structure,
    said rotor and said laser unit being rotatable together on said axis to predetermine angular positions around said axis to provide for obtaining a distance measurement reading from said laser unit to said target on said inner surface at each of said angular positions,
    said rotor comprising a disk having a generally vertical surface, and said laser unit is releasably connected to said vertical surface,
    said disk having peripherally spaced notches corresponding to angular degrees of rotation of said disk, and
    a latch member supported by said stand and positioned to engage each of said notches for holding said disk and said laser unit at a selective angle of rotation during a reading of said distance at each of said positions.

2. Apparatus as defined in claim 1 and including an angle bracket having a first portion mounted on said stand and a second portion supporting said rotor for rotation on said horizontal axis, said stand having a flat top surface, and said first portion of said angle bracket is horizontally adjustable on said top surface.

3. Apparatus as defined in claim 1 wherein said laser unit is releasably attached to said rotor by hook and loop fasteners.

4. Apparatus for measuring the inner surface of a structure embedded in the ground and defining a tunnel, said apparatus comprising
    a portable tripod having foldable legs adapted to be supported by a bottom portion of said structure and projecting upwardly into said tunnel,
    a rotor disk supported by said tripod for rotation on a generally horizontal axis and having a generally vertical support surface, a portable battery powered laser unit mounted on said support surface of said rotor disk and having means for emitting a laser beam and for determining and displaying a distance from said laser unit to a target on said inner surface of said structure, said rotor disk and said laser unit being rotatable together on said axis to predetermine angular positions around said axis to provide for obtaining a distance measurement reading from said laser unit to said target on said inner surface at each of said angular positions, said rotor disk is circular and has peripherally spaced notches corresponding to angular degrees of rotation of said disk, and a latch member supported by said tripod and positioned to engage each of said notches for holding said rotor disk and said laser unit at a selective angle of rotation during a reading of said distance at each of said positions.

5. Apparatus as defined in claim 4 wherein said latch member is spring biased in a position engaging one of said notches.

6. Apparatus as defined in claim 4 wherein said laser unit is releasably attached to said rotor disk by hook and loop fasteners.

7. Apparatus as defined in claim 4 and including an adjustable angle bracket having a horizontal first portion mounted on said tripod and a second vertical portion supporting said rotor disk for rotation on said horizontal axis.

8. Apparatus defined in claim 7 wherein said tripod has a flat top surface, and said first portion of said angle bracket is horizontally adjustable on said top surface.

* * * * *